(12) United States Patent
Kurahashi

(10) Patent No.: US 10,901,673 B2
(45) Date of Patent: Jan. 26, 2021

(54) IMAGE FORMING APPARATUS THAT SHREDS PRINTED MATERIAL WHEN PREDETERMINED TIME HAS ELAPSED AFTER THE PRINTED MATERIAL WAS STORED

(71) Applicant: KYOCERA Document Solutions Inc., Osaka (JP)

(72) Inventor: Taro Kurahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/749,298

(22) Filed: Jan. 22, 2020

(65) Prior Publication Data

US 2020/0241821 A1 Jul. 30, 2020

(30) Foreign Application Priority Data

Jan. 28, 2019 (JP) ................................. 2019-012336

(51) Int. Cl.
*G06F 3/12* (2006.01)

(52) U.S. Cl.
CPC .......... *G06F 3/1292* (2013.01); *G06F 3/1204* (2013.01); *G06F 3/1206* (2013.01); *G06F 3/1259* (2013.01); *G06F 3/1288* (2013.01)

(58) Field of Classification Search
USPC ............ 358/1.1–3.29; 399/8–20, 75–82, 366
See application file for complete search history.

(56) References Cited

U.S. PATENT DOCUMENTS

| 2004/0193440 A1* | 9/2004 | Mawatari | ............... | G06Q 30/06 |
| | | | | 705/307 |
| 2006/0032957 A1* | 2/2006 | Kolbet | .................. | B02C 21/026 |
| | | | | 241/101.74 |
| 2006/0187481 A1* | 8/2006 | Hayakawa | ............ | G06F 3/1238 |
| | | | | 358/1.14 |

(Continued)

FOREIGN PATENT DOCUMENTS

| JP | 2000-185449 A | 7/2000 |
| JP | 2017-146827 A | 8/2017 |

OTHER PUBLICATIONS

Extended European Search Report dated Jun. 12, 2020 mailed in the corresponding European Patent Application No. 20152730.6.

*Primary Examiner* — Marcellus J Augustin
(74) *Attorney, Agent, or Firm* — IP Business Solutions, LLC

(57) ABSTRACT

An image forming apparatus includes an image forming device that forms an image on a recording sheet, a storage box for storing a printed material obtained by the image forming device forming the image on the recording sheet, a shredding device that shreds the printed material stored in the storage box, a controller that controls the shredding device so as to shred the printed material, upon deciding that a predetermined first standby time has elapsed after the printed material was stored in the storage box, and a communication device that performs wireless communication with a mobile device carried by a user. The controller transmits warning information to the effect that the printed material is about to be shredded, to the mobile device, upon deciding that a predetermined second standby time, shorter than the first standby time, has elapsed after the printed material was stored in the storage box.

3 Claims, 5 Drawing Sheets

(56) References Cited

U.S. PATENT DOCUMENTS

| | | |
|---|---|---|
| 2008/0232827 A1 | 9/2008 | Yamaguchi et al. |
| 2017/0243087 A1 | 8/2017 | Awatsu |
| 2018/0261050 A1* | 9/2018 | Crooks .............. B02C 18/0007 |
| 2018/0278780 A1* | 9/2018 | Bhaskaran ............ G06F 21/608 |

* cited by examiner

Fig.5

| ID CODE | DATE/TIME OF PRINT JOB | PRINTED MATERIAL SHREDDING 1:YES 0:NO |
|---|---|---|
| D00012 | YYYY.MM.DD.HH.MM | 1 |
| A00053 | YYYY.MM.DD.HH.MM | 0 |
| D00068 | YYYY.MM.DD.HH.MM | 0 |
| D00012 | YYYY.MM.DD.HH.MM | 1 |
| A00019 | YYYY.MM.DD.HH.MM | 0 |
| D00045 | YYYY.MM.DD.HH.MM | 0 |
| A00019 | YYYY.MM.DD.HH.MM | 0 |
| B00077 | YYYY.MM.DD.HH.MM | 1 |
| D00036 | YYYY.MM.DD.HH.MM | 0 |
| B00077 | YYYY.MM.DD.HH.MM | 0 |
| A00053 | YYYY.MM.DD.HH.MM | 0 |
| D00092 | YYYY.MM.DD.HH.MM | 1 |
| | | |

104

IMAGE FORMING APPARATUS THAT SHREDS PRINTED MATERIAL WHEN PREDETERMINED TIME HAS ELAPSED AFTER THE PRINTED MATERIAL WAS STORED

INCORPORATION BY REFERENCE

This application claims priority to Japanese Patent Application No. 2019-012336 filed on Jan. 28, 2019, the entire contents of which are incorporated by reference herein.

BACKGROUND

The present disclosure relates to a technique to prevent leakage of information from a printed material.

Some printers are configured to output a message, when the distance between a mobile device of a user and the printer exceeds a predetermined threshold before the printer completes the printing job, to the effect that the printed material is left uncollected, to the mobile device. In the case of a printer installed in a convenience store, when the user leaves the convenience store before the printer completes the printing job, the printer outputs the message to the effect that the printed material is left uncollected, to the mobile device. In addition, the printer is configured to store the printed material in an output box with a lock, and cut the printed material with a shredder, when a predetermined time has elapsed.

SUMMARY

The disclosure proposes a further improvement of the foregoing technique.

In an aspect, the disclosure provides an image forming apparatus including an image forming device, a storage box, a shredding device, a communication device, and a control device. The image forming device forms an image on a recording sheet. The storage box is for storing a printed material obtained by the image forming device forming the image on the recording sheet. The shredding device shreds the printed material stored in the storage box. The communication device performs wireless communication with a mobile device carried by a user. The control device includes a processor, and acts, when the processor executes a control program, as a controller that controls the shredding device so as to shred the printed material, upon deciding that a predetermined first standby time has elapsed after the printed material was stored in the storage box. The controller transmits, to the mobile device through the communication device, predetermined warning information to an effect that the printed material is about to be shredded, upon deciding that a predetermined second standby time, shorter than the first standby time, has elapsed after the printed material was stored in the storage box.

BRIEF DESCRIPTION OF THE DRAWINGS

FIG. 5 is a table showing an example of data structure stored in a history information memory.

DETAILED DESCRIPTION

Figure 1:
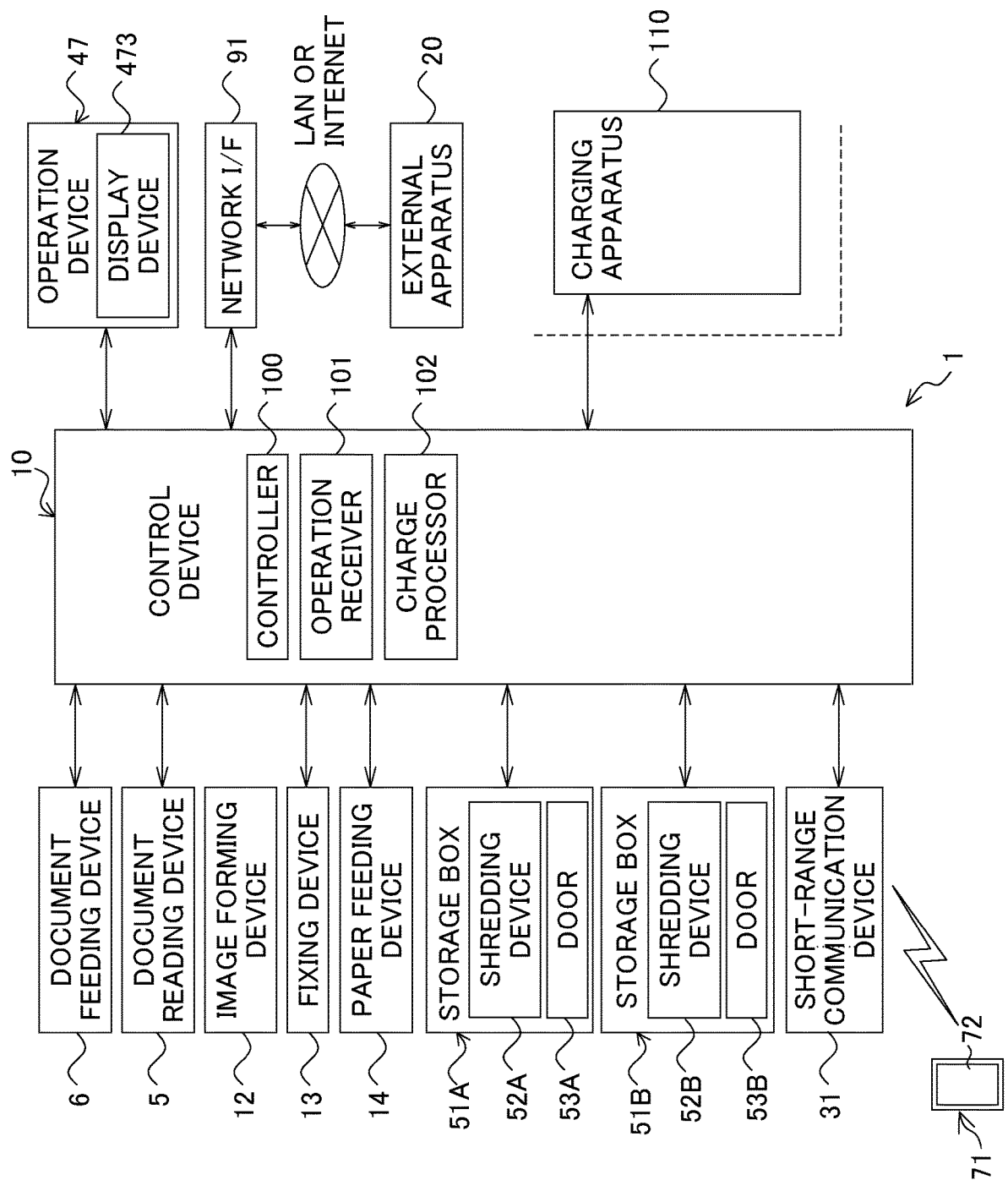
FIG. 1 is a functional block diagram schematically showing an essential internal configuration of an image forming apparatus according to a first embodiment of the disclosure.

Hereafter, an image forming apparatus according to an embodiment of the disclosure will be described, with reference to the drawings. FIG. 1 is a functional block diagram schematically showing an essential internal configuration of the image forming apparatus according to a first embodiment of the disclosure.

The image forming apparatus 1 is a multifunction peripheral having a plurality of functions, such as copying, printing, scanning, and facsimile transmission. The image forming apparatus 1 includes a control device 10, a document feeding device 6, a document reading device 5, an image forming device 12, a fixing device 13, a paper feeding device 14, a plurality of storage boxes 51A and 51B (hereinafter may be collectively referred to as "storage box 51"), a short-range communication device 31, an operation device 47, and a network interface (I/F) 91. In addition, the image forming apparatus 1 is configured to accept connection of a charging apparatus 110.

The charging apparatus 110 (e.g., coin vendor) is a known apparatus configured to receive money, collect the printing charge, and return the change, if any. The charging apparatus 110 includes a non-illustrated money slot, a deposit sensor for detecting that money has been deposited, a distinction sensor for identifying the type of the deposited money, a balance display device, and a return slot. The charging apparatus 110 recognizes the deposited amount, subtracts the printing charge from the deposited amount according to the number of copies printed (under the instruction from a charge processor 102 to be subsequently described), and recognizes the balance after subtracting the printing charge, using a known technique. Here, the charging apparatus 110 operates under the control of the controller 100 of the image forming apparatus 1.

To perform the document reading operation, the image forming apparatus 1 operates as follows. The document reading device 5 optically reads the image on a source document delivered from the document feeding device 6 or placed on a non-illustrated platen glass, and generates image data. The image data generated by the document reading device 5 is stored, for example, in a non-illustrated image memory.

To perform the image forming operation, the image forming apparatus 1 operates as follows. The image forming device 12 forms a toner image on a recording sheet delivered from the paper feeding device 14, on the basis of the image data generated through the document reading operation, or received from an external apparatus 20 such as a computer, connected via a network.

The fixing device 13 heats and presses the recording sheet on which the toner image has been formed by the image forming device 12, to thereby fix the toner image on the recording sheet. The recording sheet that has undergone the fixing process is outputted to the storage box 51, to be stored therein. The paper feeding device 14 includes one or more paper cassettes.

In each of the storage boxes 51A and 51B, the printed materials, obtained through the image forming operation performed by the image forming device 12 on the recording sheet, are accumulated and stored. The storage boxes 51A and 51B respectively include shredding devices 52A and 52B (hereinafter may be collectively referred to as "shredding device 52"), configured to shred the printed material stored in the storage box 51. The storage boxes 51A and 51B are each configured to accommodate the printed material therein, and provided with a key that can be unlocked, for example by inputting a personal identification number (PIN) code. The storage boxes 51A and 51B are each given a box number.

The storage boxes 51A and 51B each include a door that can be unlocked and locked under the control of the controller 100. The door is kept closed while being locked, and can be opened upon being unlocked. The door can be opened and closed, to shield the printed material stored inside from outside in the closed state, and allow access to the printed material stored inside, in the opened state. The door of the storage box 51A will be referred to as door 53A, and the door of the storage box 51B will be referred to as door 53B. Hereinafter, the door 53A of the storage box 51A and the door 53B of the storage box 51B may be collectively referred to as "door".

The short-range communication device 31 performs wireless communication with a mobile device 71 carried by the user, by a short-range wireless communication method such as near-field communication (NFC), Bluetooth (registered trademark), or a wireless LAN.

The mobile device 71 includes an interface device compatible with the short-range communication such as the NFC and also with the wireless LAN communication, and a display device 72. The mobile device 71 is also configured to acquire its own position information, and can be exemplified by a smartphone.

The operation device 47 includes hard keys for inputting instructions, to receive instructions from the user to execute the functions and operations that the image forming apparatus 1 is configured to perform, for example the image forming operation. The operation device 47 includes a display device 473 for displaying, for example, an operation guide for the user. The display device 473 possesses a touch panel function, so that the user can operate the image forming apparatus 1 by touching buttons and keys displayed on the screen.

The network I/F 91 transmits and receives various data to and from the external apparatus 20, such as a terminal device or a server on the internet or in the local area, or the mobile device 71. The network I/F 91 exemplifies the communication device in the disclosure.

The control device 10 includes a processor, a random-access memory (RAM), a read-only memory (ROM), and an exclusive hardware circuit. The processor is, for example, a central processing device (CPU), an application specific integrated circuit (ASIC), or a micro processing device (MPU). The control device 10 includes a controller 100, an operation receiver 101, and a charge processor 102.

The control device 10 acts, when the processor operates according to a control program installed in a non-illustrated hard disk drive (HDD), as the controller 100, the operation receiver 101, and the charge processor 102. Here, the controller 100 and other components cited above may each be constituted in the form of a hardware circuit, instead of being realized by the control device 10 according to the control program. This also applies to other embodiments, unless otherwise specifically noted.

The controller 100 controls the overall operation of the image forming apparatus 1. The controller 100 is connected to the document feeding device 6, the document reading device 5, the image forming device 12, the fixing device 13, the paper feeding device 14, the storage box 51, the short-range communication device 31, the operation device 47, and the network I/F 91, to control the operation of the mentioned components. For example, the controller 100 acquires personal information stored in the mobile device 71 (e.g., ID code, IP address of the mobile device 71) through the NFC, from the mobile device 71 brought close to the short-range communication device 31 of the image forming apparatus 1.

The controller 100 also controls the shredding device 52 so as to shred the printed material stored in the storage box 51, upon deciding that a predetermined first standby time T1 (e.g., 20 minutes) has elapsed after the printed material was stored in the storage box 51. Here, the controller 100 retains the first standby time T1 in a memory, so that the first standby time T1 can be extended according to an instruction of the user, received by the operation receiver 101 through the operation device 47.

The operation receiver 101 receives the input made by the user through the operation device 47. For example, the operation receiver 101 receives the instruction of the user inputted with the hard keys of the operation device 47, and also the instruction of the user inputted using the touch panel function of the display device 473, through the operation screen displayed on the display device 473.

For example, when the operation receiver 101 receives a copying instruction from the user, the controller 100 causes the document reading device 5 to read a source document, and causes the image forming device 12 to form the image on the recording sheet, on the basis of the image data acquired through the reading operation of the document reading device 5. The printed material, in other words the recording sheet on which the image has been formed, is outputted to inside the storage box 51. Accordingly, the printed material is prevented from being viewed or taken away by a third party.

Here, the box number of the storage box 51 to which the printed material is to be outputted, and the PIN code for unlocking the storage box 51, are displayed by the controller 100 on the display device 473, when the operation receiver 101 receives the copying instruction from the user. Thus, the PIN code is notified to the user. More specifically, the controller 100 randomly determines the PIN code, and retains the determined PIN code in a memory in association with the box number of a vacant storage box 51. Then the controller 100 displays the vacant box number and the corresponding PIN code, on the display device 473.

The user can pick up the printed material stored in the storage box 51, through the following procedure. When the operation receiver 101 receives the user's request to deliver the printed material through the operation device 47, the controller 100 causes the display device 473 to display an operation screen showing a message such as "Please input box number", to urge the user to input the box number.

When the operation receiver 101 receives the box number inputted by the user through the operation device 47, the controller 100 causes the display device 473 to display an operation screen showing a message such as "Please input PIN code", to urge the user to input the PIN code. Upon deciding that the PIN code inputted by the user and received by the operation receiver 101 and the PIN code stored in association with the box number accord with each other (i.e., an unlock requirement, that the PIN code received by the operation receiver 101 should accord with a predetermined number, has been satisfied) the controller 100 unlocks the storage box 51 corresponding to the box number inputted. Thus, the user can pick up the printed material from the storage box 51. Here, the controller 100 unlocks the storage box 51 provided that another unlock requirement, that the printing charge C1 has been collected, is also satisfied.

The charge processor 102 executes a charging process, including determining a printing charge C1 according to the detail of the print job, and collecting the printing charge C1 determined. For example, the controller 100 causes the image forming device 12 to execute the print job according to the detail of the print job instructed by the user, and when the print job is completed the charge processor 102 transmits a signal requesting counting up of the print charge according to the detail of the print job (e.g., number of copies printed), to the charging apparatus 110.

The controller 100 unlocks the key of the storage box 51A or 53A, provided that the PIN code received by the operation receiver 101 accords with the predetermined number, and that the charge processor 102 has confirmed that the printing charge (and extension charge if necessary) has been collected from the user, but keeps the key of the storage box 51A or 53A locked, until the mentioned requirements are satisfied.

As will be subsequently described in further detail, when the first standby time T1 is extended by the user's instruction, an extension charge C2 is incurred. Therefore, the charge processor 102 determines an extension charge C2 according to the length of the extension time TE from the first standby time T1, and executes the charging process to collect the extension charge C2 determined as above, from the user. Accordingly, when the extension charge C2 is incurred, the collection of the extension charge C2 is also added to the unlock requirements.

Here, it is preferable to provide an upper limit (e.g., 20 minutes) to the extension time TE, to prevent shortage of the vacant storage box 51. In addition, it is preferable that the charge processor 102 sets the extension charge C2 in proportion to the length of the extension time TE, to an amount lower than the printing charge C1, even when the extension time TE is set to the upper limit by the user. If the extension charge C2 were higher than the printing charge C1, reprinting would be less expensive than the extension charge, which would discourage the user from making haste to pick up the printed material, from the viewpoint of cost.

For example, when the printing charge C1 is 300 yen, the charge processor 102 sets the extension charge C2 for the extension time TE of 20 minutes, which is the upper limit, to an amount lower than 300 yen. When the extension time TE is 20 minutes corresponding to the upper limit, the charge processor 102 may set the extension charge C2, for example, to 75% (230 yen) of the printing charge C1. Likewise, the charge processor 102 may set the extension charge C2 to 50% (150 yen) of the printing charge C1, when the extension time TE is 15 minutes, and to 25% (80 yen) of the printing charge C1 when the extension time TE is 10 minutes. When the extension time TE is as short as 5 minutes, the charge processor 102 may set the extension charge to free. Although 75% of the printing charge C1 "300 yen" is 225 yen, the printing charges are normally set in increments of 10 yen, and therefore an odd amount smaller than 10 yen is rounded up, so that the 75% of the printing charge C1 of "300 yen" is set to 230 yen.

Figure 2:
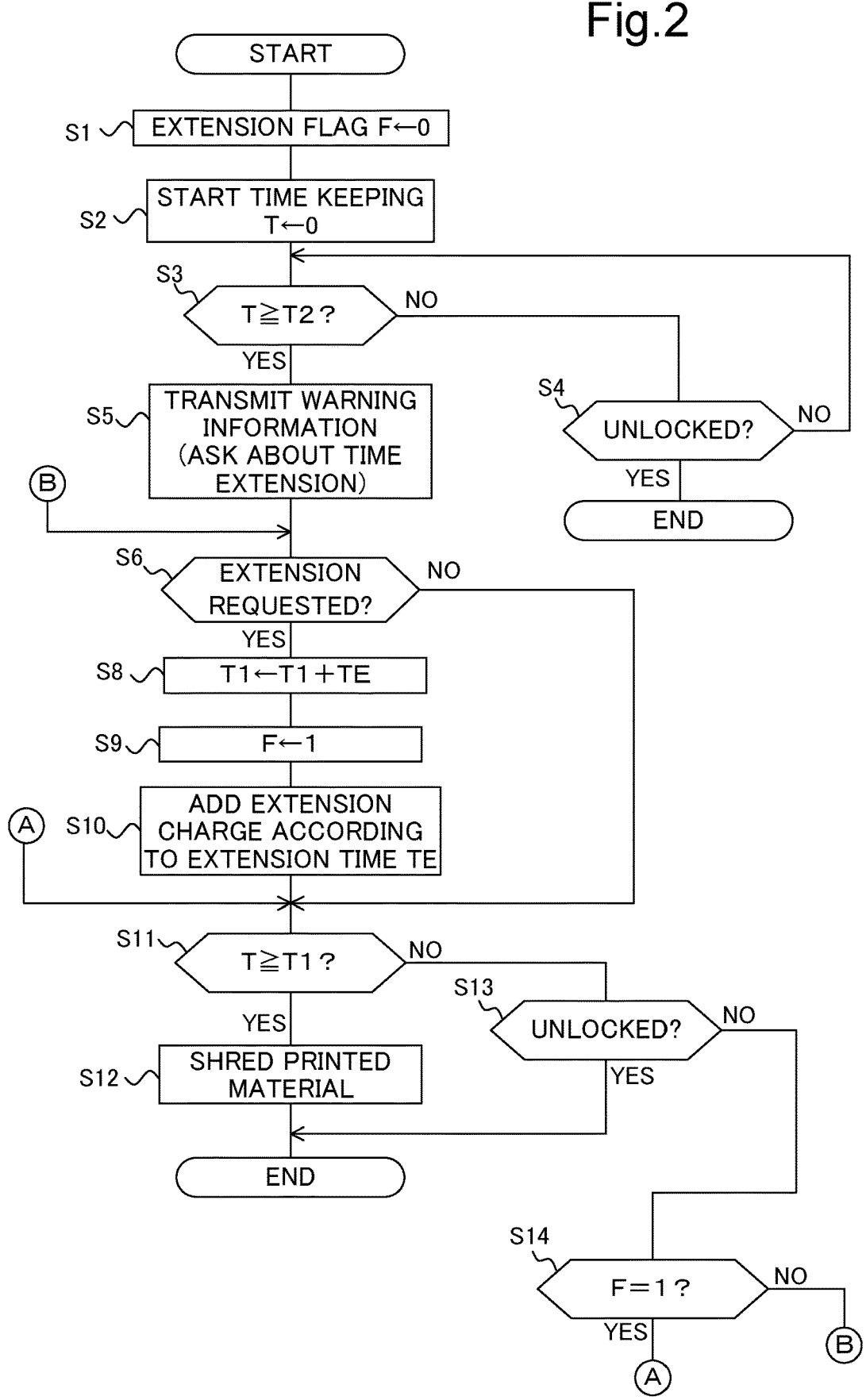
FIG. 2 is a flowchart showing an example of an operation performed by a control device of the image forming apparatus according to the first embodiment.

Referring now to the flowchart of FIG. 2, an example of the operation performed by the control device 10 of the image forming apparatus 1 according to the first embodiment will be described hereunder. The following operation is performed after the print job is finished. It will be assumed that, when the print job is finished, the charge processor 102 has determined the printing charge C1, according to the detail of the print job executed.

First, the controller 100 sets, as initial setting, an extension flag F indicating that the first standby time T1 before shredding of the printed material has been extended to 0 (S1), and resets a timer T incorporated in the control device 10 to 0. Then the controller 100 starts to measure the elapsed time after the printed material was stored in the storage box 51, using the timer T (S2).

The controller 100 decides whether a predetermined second standby time T2 has elapsed, after the printed material was stored in the storage box 51 (S3). The second standby time T2 is shorter than the first standby time T1 and, for example, set to 15 minutes when the first standby time T1 is 20 minutes.

Upon deciding that the second standby time T2 has not yet been reached (NO at S3), the controller 100 decides whether the storage box 51 has been unlocked (S4). When the controller 100 decides that the storage box 51 has been unlocked (YES at S4), it can be construed that the user has picked up the printed material stored in the storage box 51, and therefore the operation is finished. In this process, the controller 100 unlocks the door of the storage box 51, provided that the unlock requirements, in other words the input of the PIN code and the collection of the printing charge C1, are satisfied.

When the controller 100 decides that the storage box 51 has not been unlocked (NO at S4), the operation returns to S3.

In contrast, upon deciding that the second standby time T2 has elapsed (YES at S3), the controller 100 transmits, through the network I/F 91, predetermined warning information to the effect that the printed material is about to be shredded, and also a message inquiring the user whether the first standby time T1 is to be extended, to the mobile device 71 corresponding to the IP address acquired in advance through the short-range communication device 31 (S5).

For example, warning information including such a message M1 as "Printed document will soon be shredded. Please pick up" (see FIG. 3), as well as option information including an option of the extension time TE of the first standby time T1, and such a message M2 as "Time before shredding can be extended only once, by a charge. Would you like to extend?" (see FIG. 3) are transmitted to the mobile device 71, from the image forming apparatus 1.

Figure 3:
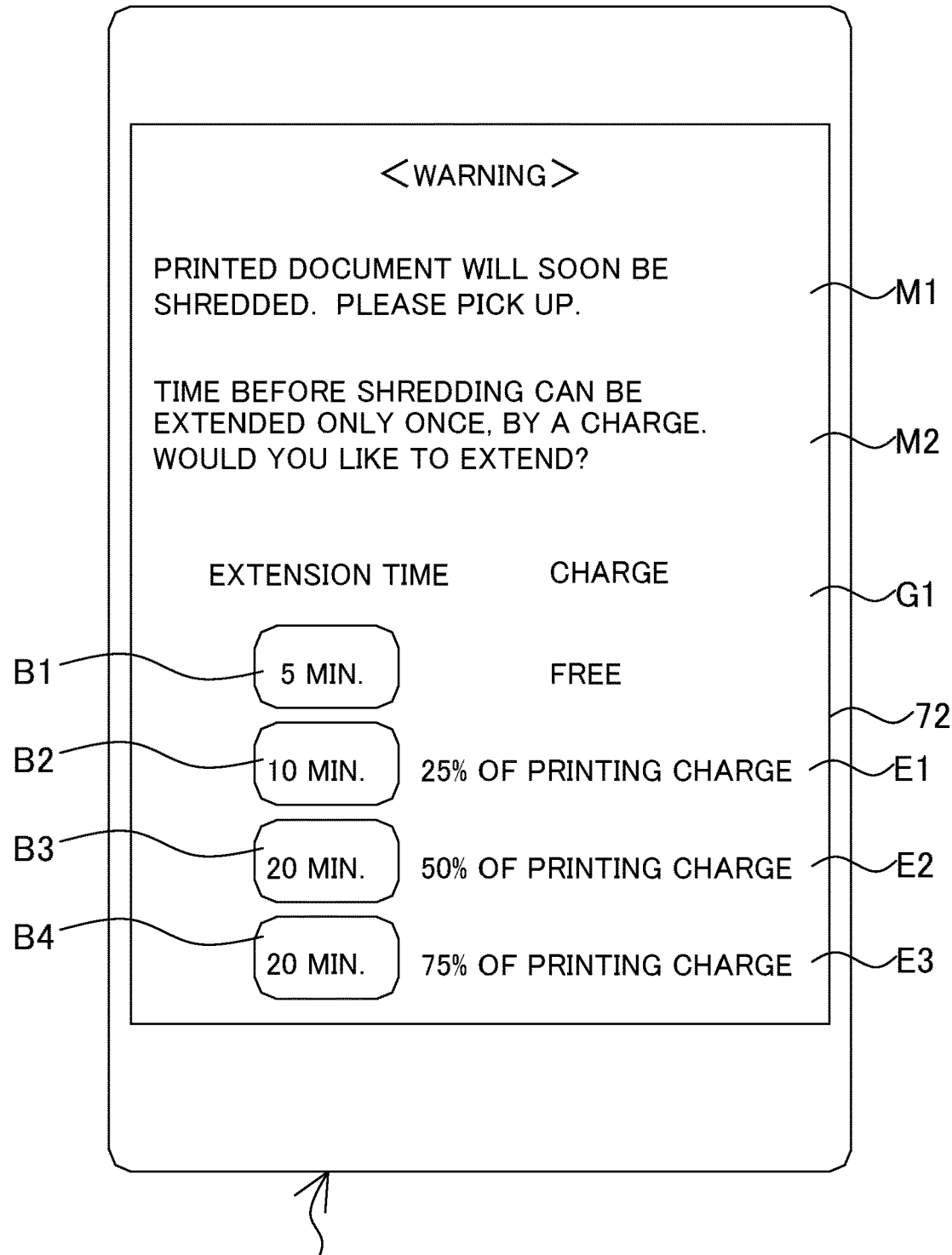
FIG. 3 is a schematic drawing showing an example of an operation screen displayed on a display device of a mobile device.

The mobile device 71 is configured to display, on the display device 72, the messages M1 and M2 expressed by the warning information and the option information transmitted from the image forming apparatus 1, and the option provided by the option information in the form of select buttons, and possesses an application designed to receive the user's instruction to request the extension of the first standby time T1, and transmit the user's instruction to the image forming apparatus 1. Therefore, when the second standby time T2 has elapsed after the printed material was stored in the storage box 51, an operation screen G1 including the messages M1 and M2 and select buttons B1 to B4 is displayed on the display device 72 of the mobile device 71, as shown in FIG. 3. The select buttons B1 to B4 each indicate an extension time to be instructed to the image forming apparatus 1. In addition, notices E1 to E3, indicating the extension charges respectively corresponding to the extension times displayed, are displayed close to the select buttons B1 to B4.

When the user touches one of the select buttons B1 to B4, and the mobile device 71 receives the user's instruction designating the extension time TE from the first standby time T1, the mobile device 71 transmits the received instruction to the image forming apparatus 1. For example, when the user touches the select button B2, the mobile device 71 transmits the instruction to set the extension time to 10 minutes, to the image forming apparatus 1. At this point, the user can confirm the extension charge corresponding to the selected extension time, in view of the notices E1 to E3.

Then the controller 100 of the image forming apparatus 1 decides whether the user's instruction to extend the first standby time T1 has been received (S6). More specifically, the controller 100 decides whether the user's instruction designating the extension time TE, transmitted from the mobile device 71, has been received through the network I/F 91.

Upon deciding that the mentioned instruction of the user has been received (YES at S6), the controller 100 adds the extension time TE indicated by the user's instruction received, to the first standby time T1, thus to update the first standby time T1 to a revised first standby time T1 (S8), and sets the extension flag F to 1 (S9). The charge processor 102 determines the extension charge C2 according to the length of the extension time TE, and adds the extension charge C2 to the printing charge C1 (S10). Thereafter, the operation proceeds to S11.

In contrast, upon deciding that the user's instruction to extend the first standby time T1 has not been received (NO at S6), the controller 100 skips the steps S7 to S10, and proceeds to S11.

The controller 100 decides whether the first standby time T1 has elapsed after the printed material was stored in the storage box 51 (S11). Upon deciding that the first standby time T1 has elapsed (YES at S11), the controller 100 controls the shredding device 52 so as to shred the printed material stored in the storage box 51 (S12), and finishes the operation.

In contrast, upon deciding that the first standby time T1 has not yet elapsed (NO at S11), the controller 100 decides whether the storage box 51 has been unlocked (S13). When it is decided that the storage box 51 has been unlocked (YES at S13), it can be construed that the user has picked up the printed material stored in the storage box 51, and therefore the operation is finished. At this point, the controller 100 unlocks the door of the storage box 51, depending on whether the unlock requirements, namely the input of the PIN code and the collection of the printing charge C1 and the extension charge C2, have been satisfied.

Upon deciding that the storage box 51 has not been unlocked (NO at S13), the controller 100 decides whether the extension flag F is set to 1 (S14). When it is decided that the extension flag F is set to 1 (YES at S14), the operation returns to S11. When it is decided that the extension flag F is not set to 1 (NO at S14), the operation returns to S6.

According to the first embodiment, the warning information, to the effect that the printed material stored in the storage box 51 is about to be shredded, is transmitted to the mobile device 71 carried by the user, before the printed material is shredded. Such an arrangement allows the user to be aware that the time before the shredding is running out, and take an action to avid the shredding. Therefore, the convenience for the user can be maintained unimpaired, with minimized risk of leakage of the information. In addition, the recording sheets can be prevented from being wasted in vain.

Further, since the first standby time T1 before the shredding can be extended in response to the user's request, such a disadvantage to the user that the first standby time T1 expires while the user is returning to pick up the printed material, and that therefore the printed material is shredded, can be avoided.

Here, although the first embodiment represents the case where the user designates the extension time TE from the first standby time T1, in another embodiment the user may simply request the extension of the first standby time T1, and the controller 100 may extend, upon receipt of the extension request, the first standby time T1 by a predetermined length (e.g., 10 minutes).

With an existing printer referred to as the background art, when the user moves away from the printer during the execution of the print job, there is a risk that the printed material is viewed or taken away by a third party other than the user. Since the printed material often includes information that should be concealed, such as the personal information, allowing a third party to view or take away the printed material leads to leakage of information, which provokes a problem in terms of security.

Although some of the existing printers are configured to prevent the leakage of information by storing the printed material in the output box that can be locked, the stored printed material is shredded when a predetermined time has elapsed. Therefore, once the printed material is shredded, the user is forced to take the trouble to reprint the document with an additional cost, which significantly impairs the convenience for the user. In addition, the recording sheets are wasted in vain.

With the arrangement according to the first embodiment, unlike the above, the convenience for the user can be maintained unimpaired, with minimized risk of leakage of information.

Figure 4:
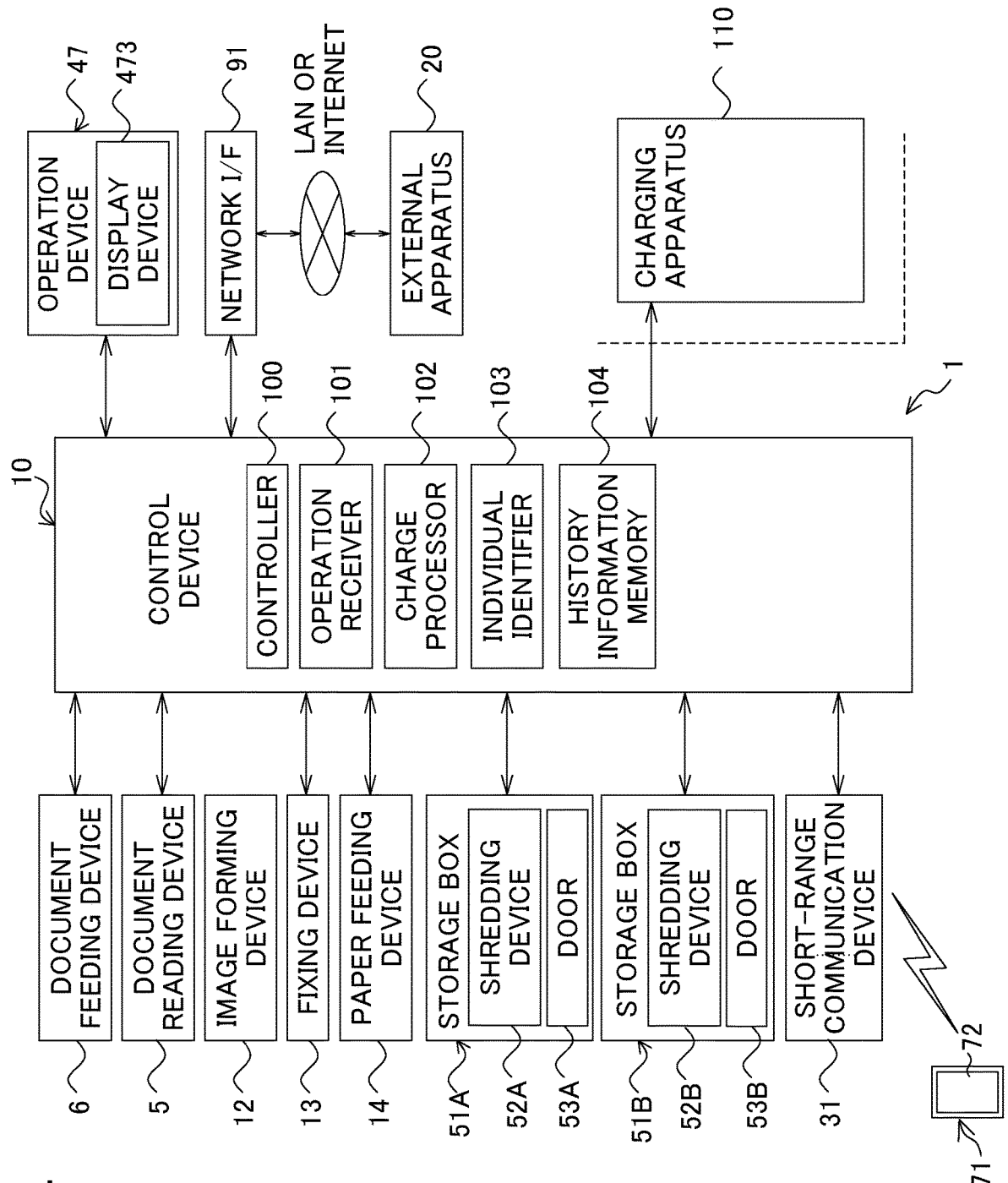
FIG. 4 is a functional block diagram schematically showing an essential internal configuration of an image forming apparatus according to a second embodiment.

FIG. 4 is a functional block diagram schematically showing an essential internal configuration of an image forming apparatus according to a second embodiment. The image forming apparatus according to the second embodiment is different from the image forming apparatus 1 shown in FIG. 1, in that the control device 10 includes an individual identifier 103 and a history information memory 104, and also that the controller 100 is configured to change the length of the second standby time T2.

The individual identifier 103 identifies the individual user who has ordered the print job. More specifically, the individual identifier 103 identifies the user, for example by NFC, on the basis of the personal information (ID code) acquired by the controller 100 from the mobile device 71, when the user brings the mobile device 71 close to the short-range communication device 31 of the image forming apparatus 1.

In the history information memory 104, history information related to a shredding history of the printed material is stored, with respect to each of the users who have ordered the print job. For example as shown in FIG. 5, information related to the history of the print jobs and the shredding history of the printed material is stored in the history information memory 104, in association with the ID code of the user. Therefore, the frequency of shredding the printed material can be calculated with respect to each of the users, on the basis of the history information stored in the history information memory 104.

The controller 100 sets the length of the second standby time T2, on the basis of a shredding frequency of the printed material, acquired from the history information stored in the history information memory 104, corresponding to each of the users identified by the individual identifier 103, so as to be shorter when the shredding frequency is equal to or higher than a predetermined threshold, than when the shredding frequency is lower than the threshold.

For example, when the shredding frequency is lower than the threshold, the controller 100 may set the second standby time T2 to 15 minutes. However, when the shredding frequency is equal to or higher than the threshold, the controller 100 may set the second standby time T2 to 10 minutes. In this case, the warning information shown in FIG. 3 can be transmitted at an earlier stage, to the user who more often leaves the printed material unattended.

The disclosure may be modified in various manners, without limitation to the foregoing embodiment. For example, although the embodiment takes up the MFP as an example of the image forming apparatus according to the disclosure, the disclosure is also applicable to various other image forming apparatuses having a copying function or a printing function.

Further, the configurations and processings described with reference to FIG. 1 and FIG. 5 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   an image forming device that forms an image on a recording sheet;
   a storage box for storing a printed material obtained by the image forming device forming the image on the recording sheet;
   a shredding device that shreds the printed material stored in the storage box;
   a communication device that performs wireless communication with a mobile device carried by a user; and
   a control device including a processor, and configured to act, when the processor executes a control program, as a controller that controls the shredding device so as to shred the printed material, upon deciding that a predetermined first standby time has elapsed after the printed material was stored in the storage box,
   wherein the controller transmits, to the mobile device through the communication device, predetermined warning information to an effect that the printed material is about to be shredded, upon deciding that a predetermined second standby time, shorter than the first standby time, has elapsed after the printed material was stored in the storage box,
   the controller transmits a message inquiring the user whether the first standby time is to be extended, to the mobile device through the communication device, and extends the first standby time, upon receipt of an instruction of the user to extend the first standby time, from the mobile device through the communication device,
   the controller extends the first standby time, upon receipt of an instruction of the user designating an extension time from the first standby time, from the mobile device through the communication device, according to the extension time designated by the instruction received,
   the image forming apparatus further comprises a charge processor that executes a charging process of an amount according to a length of the extension time,
   wherein the charge processor executes the charging process according to a detail of a print job,
   a predetermined upper limit is provided to the extension time, and
   the charge processor sets an extension charge according to the length of the extension time, to an amount lower than a printing charge according to the detail of the print job for providing the printed material, even when the extension time is set to the upper limit.

2. An image forming apparatus comprising:
   an image forming device that forms an image on a recording sheet;
   a storage box for storing a printed material obtained by the image forming device forming the image on the recording sheet;
   a shredding device that shreds the printed material stored in the storage box;
   a communication device that performs wireless communication with a mobile device carried by a user; and
   a control device including a processor, and configured to act, when the processor executes a control program, as a controller that controls the shredding device so as to shred the printed material, upon deciding that a predetermined first standby time has elapsed after the printed material was stored in the storage box,
   wherein the controller transmits, to the mobile device through the communication device, predetermined warning information to an effect that the printed material is about to be shredded, upon deciding that a predetermined second standby time, shorter than the first standby time, has elapsed after the printed material was stored in the storage box,
   the controller transmits a message inquiring the user whether the first standby time is to be extended, to the mobile device through the communication device, and extends the first standby time, upon receipt of an instruction of the user to extend the first standby time, from the mobile device through the communication device,
   the controller extends the first standby time, upon receipt of an instruction of the user designating an extension time from the first standby time, from the mobile device through the communication device, according to the extension time designated by the instruction received,
   the image forming apparatus further comprises:
   a charge processor that executes a charging process of an amount according to a length of the extension time;
   an operation device through which the user can input a personal identification number code; and
   an operation receiver that receives the personal identification number code inputted through the operation device,
   wherein the storage box further includes a door with a key that can be unlocked and locked under control of the controller, so as to keep the door closed in a locked state, and allow the door to open in an unlocked state, the door performing opening and closing under which the printed material stored inside is shielded from outside in the closed state and the printed material stored inside is allowed to be opened to the outside in the opened state, and
   the controller unlocks the key of the storage box, provided that conditions that the personal identification number code received by the operation receiver accords with a predetermined number, and that the charge processor confirms collection of a printing charge and an extension charge from the user, are satisfied, and keeps the key of the storage box locked, until the conditions are satisfied.

3. An image forming apparatus comprising:

an image forming device that forms an image on a recording sheet;

a storage box for storing a printed material obtained by the image forming device forming the image on the recording sheet;

a shredding device that shreds the printed material stored in the storage box;

a communication device that performs wireless communication with a mobile device carried by a user; and a control device including a processor, and configured to act, when the processor executes a control program, as a controller that controls the shredding device so as to shred the printed material, upon deciding that a predetermined first standby time has elapsed after the printed material was stored in the storage box, wherein the controller transmits, to the mobile device through the communication device, predetermined warning information to an effect that the printed material is about to be shredded, upon deciding that a predetermined second standby time, shorter than the first standby time, has elapsed after the printed material was stored in the storage box, the image forming apparatus further comprises:

a history information memory in which history information indicating a shredding history of the printed material is stored, with respect to each of users who have ordered a print job; and an individual identifier that identifies an individual user who has ordered the print job, wherein on a basis of a shredding frequency of the printed material, the controller sets a length of the second standby time so as to be shorter, when the shredding frequency is equal to or higher than a predetermined threshold, than when the shredding frequency is lower than the threshold, the shredding frequency being indicated by the history information that is stored in the history information memory and corresponding to each of the users identified by the individual identifier.

* * * * *